(12) United States Patent
Glaubitz

(10) Patent No.: US 7,381,324 B2
(45) Date of Patent: Jun. 3, 2008

(54) HYDROMECHANICAL DRIVING DEVICE

(75) Inventor: Robert Manfred Glaubitz, Mühlheim (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 552 days.

(21) Appl. No.: 10/521,740

(22) PCT Filed: Jul. 4, 2003

(86) PCT No.: PCT/EP03/07162

§ 371 (c)(1),
(2), (4) Date: Jan. 19, 2005

(87) PCT Pub. No.: WO2004/018075

PCT Pub. Date: Mar. 4, 2004

(65) Prior Publication Data

US 2005/0252046 A1 Nov. 17, 2005

(30) Foreign Application Priority Data

Aug. 7, 2002 (DE) ............................... 102 36 085

(51) Int. Cl.
*B01D 29/09* (2006.01)
(52) U.S. Cl. ......................................... 210/137; 55/352
(58) Field of Classification Search ............... 210/97, 210/107, 137, 160, 387, 541; 55/352
See application file for complete search history.

(56) References Cited

U.S. PATENT DOCUMENTS 4,054,521 A * 10/1977 Winzen ....................... 210/137
4,399,622 A 8/1983 Howard

FOREIGN PATENT DOCUMENTS

| DE | 92 17 783 U | 3/1993 |
| DE | 93 01 154 | 4/1993 |
| DE | 43 11 297 A1 | 10/1994 |
| DE | 101 26 443 | 12/2002 |
| FR | 2 698 283 A | 5/1994 |
| GB | 1154101 A | 6/1969 |

* cited by examiner

*Primary Examiner*—Terry K Cecil
(74) *Attorney, Agent, or Firm*—Roylance, Abrams, Berdo & Goodman, L.L.P.

(57) ABSTRACT

A hydromechanical driving device generates forward-pushing movements of a band-shaped filter material according to the pressure prevailing in the fluid to be filtered to operate band filter devices. The hydromechanical driving device includes a hydraulic accumulator (29) provided with a movable element (31) separating a first storage space (33) from a second storage space (35). The side of the separating element (31) bordering the first storage space (33) is impinged upon by the pressure generated the first storage space by the fluid to be filtered. A mechanical device (17) translates a movement of the separating element (31) into a forward pushing movement. A pressure control unit (47, 49, 51) generates lower pressure in the second storage space (35) than the pressure generated by the fluid to be filtered according to the amount of pressure and/or the degree of impurity of the fluid to be filtered. The lower pressure causes the separating element to be displaced.

15 Claims, 2 Drawing Sheets

HYDROMECHANICAL DRIVING DEVICE

FIELD OF THE INVENTION

The present invention relates to a hydromechanical driving device of a strip-filter mechanism for generation of feed movements of the strip-like filter material of the strip-filter mechanism as a function of the pressure prevailing in the fluid to be filtered.

BACKGROUND OF THE INVENTION

Strip-filter mechanisms in which a strip-like filter material is used as separating medium are disclosed, for example, in DE 43 11 297 A1 or DE 93 01.154 U1. In the operation of such mechanisms, the filter material is advanced as a function of the extent of fouling of the respective strip area through which the filter material flows so as to make fresh filter material available for the filtration process as required. Since the differential pressure between the fouled side and the clean side of the strip-filter mechanism grows with increase in the extent of fouling of the filter material, the value of this differential pressure or the level of the pressure prevailing in the space containing the fluid to be filtered may serve as a criterion for initiation of a filter material feed movement.

The advance of the strip-like filter material may be effected by conventional means by winding the filter material. As is shown, for example, in German Patent Application 101 26 443.7, not of the state of the art, a fouled strip from a roll containing the supply of filter material is subsequently rolled onto a roll connected to the drive shaft of the drive device. In such strip-filter mechanisms, the fluid to be filtered flows from the exterior inward through the unused filter material, so that fouling of the filter material always occurs during the filtration process on the outermost layers of the roll. The outermost layers of the roll are wound from the feed roll when the degree of fouling is sufficiently great, and onto the roll connected to the drive shaft of the drive device.

The electromotive drive devices usually provided for generation of the feed movement by rotation of the corresponding winding shaft result in relatively high structural complexity and correspondingly high costs.

SUMMARY OF THE INVENTION

An object of the present invention is to provide a drive device characterized by an especially simple design and correspondingly low production costs.

The object of the present invention is basically attained by a hydromechanical drive device used to generate feed movements of the strip-like material for operation of strip-filter mechanisms as a function of the pressure prevailing in the fluid to be filtered. The drive has a hydraulic accumulator with a movable separating element separating a first accumulator space and a second accumulator space. The movable separating element has a side adjoining the accumulator space against which the pressure of the fluid to be filtered prevailing in this space is applied. A mechanism converts movement of the separating element to feed movement. A pressure control mechanism performs the function of generating in the second accumulator space a lower pressure effecting movement of the separating element as a function of the pressure level and/or the extent of fouling of the fluid to be filtered.

For the present invention, a hydromechanical drive is provided to replace the electromotive drive systems provided in the state of the art, and to thereby obtain significant simplification. Neither an external power supply nor a corresponding electronic control unit is required. In the present invention, the pressure of the fluid to be filtered functions, because of the movement of the separating element of the hydraulic accumulator it effects, both as energy source for the drive and as an actuating variable determining initiation of the feed movement. Fouling of the section of the strip participating in the filtration process results in corresponding increase in pressure in the space of the strip-filter mechanism containing the fouled fluid to be filtered. The process in question is self-regulating, so that conversion of pressure to an electric signal may be dispensed with.

In one preferred embodiment, the pressure control mechanism generates in one of the accumulator spaces of the hydraulic accumulator a pressure which is lower than the pressure of the fluid to be filtered. A movement of the separating element of the hydraulic accumulator and accordingly movement feeding the filter material are then generated. A control valve may be provided and actuated by the movement of the separating element.

The configuration devised may be such that two fluid connections to the respective accumulator space are provided. By the first connection to this accumulator space, pressure lower than that prevailing in the first hydraulic accumulator may be generated. The pressure equaling that prevailing in the first accumulator space is generated by the second fluid connection, since it is connected to the fluid to be filtered.

In this configuration, the control valve is designed so that it is actuated by the movement of the separating element. The first fluid connection is opened when the separating element is in one end position and the second fluid connection is closed. When the separating element is in the other end position, the second fluid connection is opened and the first fluid connection is closed.

To generate by the first fluid connection pressure in the second accumulator space lower than that of the fluid to be filtered, a pressure control valve may be provided at this connection. The pressure control valve may be set for a pressure value which is lower than the pressure of the fluid to be filtered prevailing at the second fluid connection. As an alternative, this fluid connection may also be connected to the space of the strip-filter mechanism containing the filtered fluid, which space has a pressure lower than that of the fluid to be filtered.

The drive device may be integrated with the respective strip-filter mechanism on the basis of the hydrodynamic principle of operation of the drive device of the present invention, in which no external energy supply or external control is required. For example, the drive device is installed in its entirety in the respective strip-filter mechanism so that the hydraulic accumulator is positioned in or on the space containing the fluid to be filtered. The fluid may enter the first accumulator space of the hydraulic accumulator through suitable passages. Preferably, a diaphragm accumulator is used as the hydraulic accumulator. The mechanism for generation of the feed movement on the basis of the reciprocating movement of the separating element, for example, the diaphragm of the diaphragm accumulator, may have an actuating rod moving back and forth and connected to the separating element. As a component of a ratchet drive, the actuating rod converts the reciprocating movement to rotary movement in one direction of rotation (take-up direction) by a ratchet wheel and a detent operating in conjunction with this wheel to rotate the winding shaft to take up the roll with the fouled filter material. Another ratchet drive, such as a free-wheel drive (not shown), might also be used in place of the ratchet wheel.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 3:
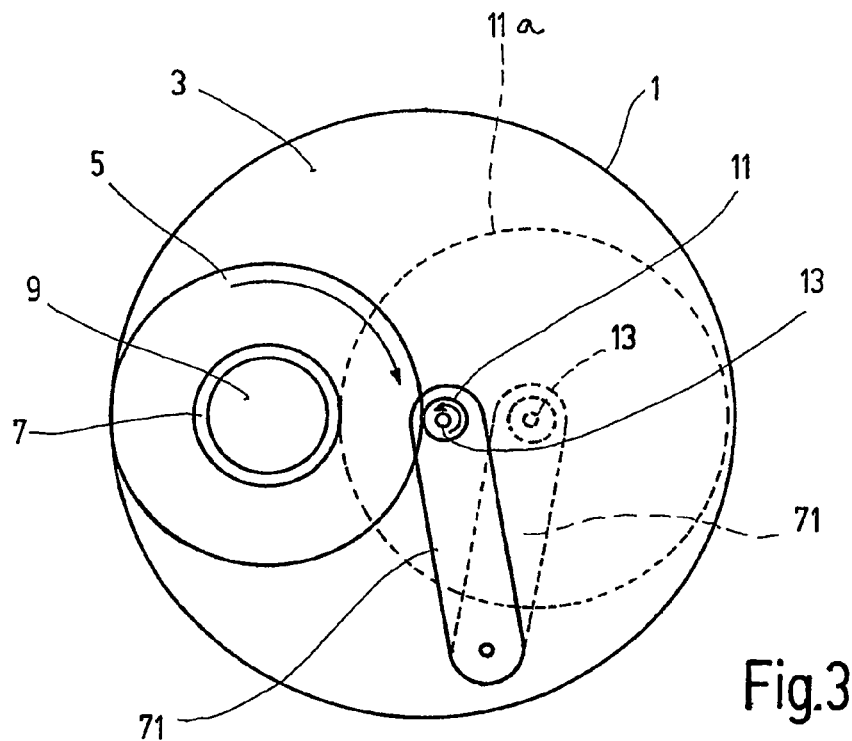
FIG. 3 is a diagrammatic top plan view showing the operation of the part of a strip-filter mechanism in which are mounted a feed roll of filter material in strip form and a roll for take-up of used filter material to be wound by the drive device according to the illustrated embodiment of the present invention.

FIG. 3 shows a greatly simplified diagram of a space 3 inside a housing 1. This space contains a fouled fluid to be filtered. A feed roll 5 with strip-like filter material is mounted to rotate freely on a fluid-permeable core 7 in the space 3. The space 9 situated inside the core 7 receives the filtered fluid which flows through the roll 5 from the exterior to the interior, that is, from the space 3. The filtration process is effected by filtration in depth. The fouling particles filtered out are deposited on the outermost layers of the feed roll 5.

The increase in the differential pressure between the space 3 containing the fluid to be filtered and the space 9 containing the filtered fluid resulting from the increase in the extent of fouling of the outer layers of the feed roll 5 performs the function of an actuating variable for initiation of a process of feeding the strip-like filter material. In that process, this filter material is wound off the feed roll 5 and onto a take-up roll 11. The directions of rotation of feed roll 5 and take-up roll 11 occurring during this feed process are indicated by curved arrows. The take-up roll 11 is set in rotation by a winding shaft 13 (also see FIG. 2) of the drive device of the present invention.

Figure 2:
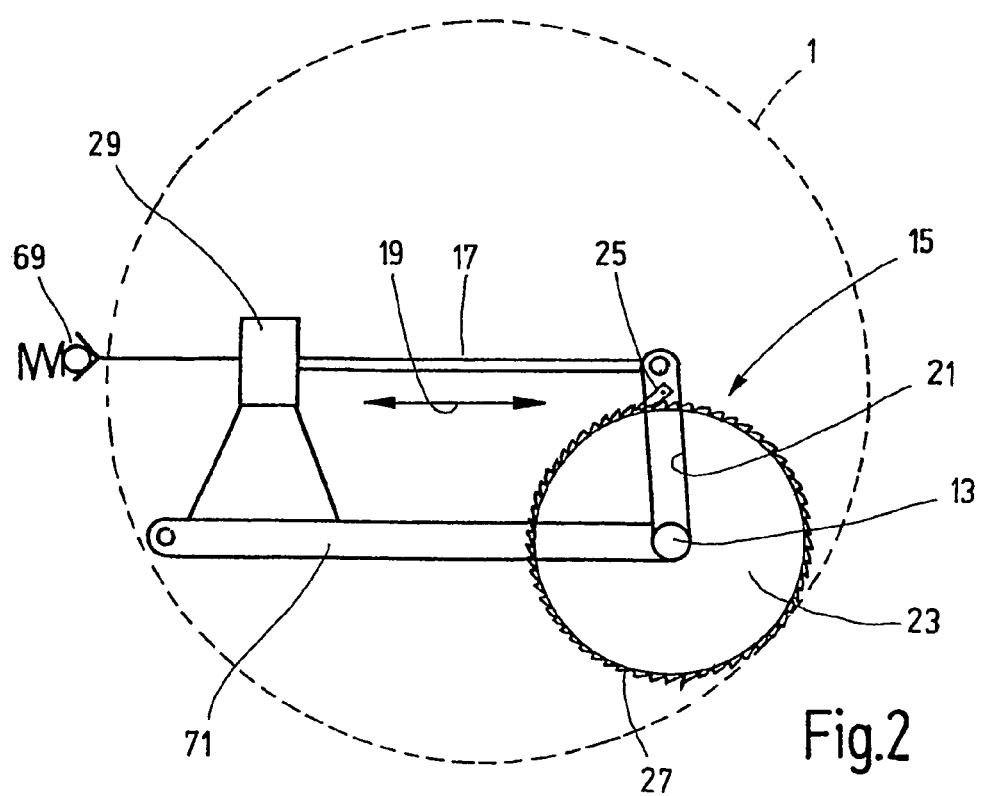
FIG. 2 is a diagrammatic view of the operation of the illustrated embodiment of the drive device of the present invention.

FIG. 2 shows a simplified diagram of the ratchet drive 15, which generates the rotary movement of the winding shaft 13 on the basis of the reciprocating movements of an actuating rod 17. The reciprocating movements of the rod 17 in the direction of the double arrow 19 result in reciprocating pivoting about the winding shaft 13 of a freely pivoting ratchet lever 21 to which a spring-loaded ratchet 25 is hinge-connected. Ratchet 25 engages the sawtooth gearing 27 of a ratchet wheel 23. This ratchet 25 interacts with the sawtooth gearing 27 so that rotary movement of the ratchet wheel 23 counterclockwise occurs only when the actuating rod 17 moves to the left (in FIG. 2).

Figure 1:
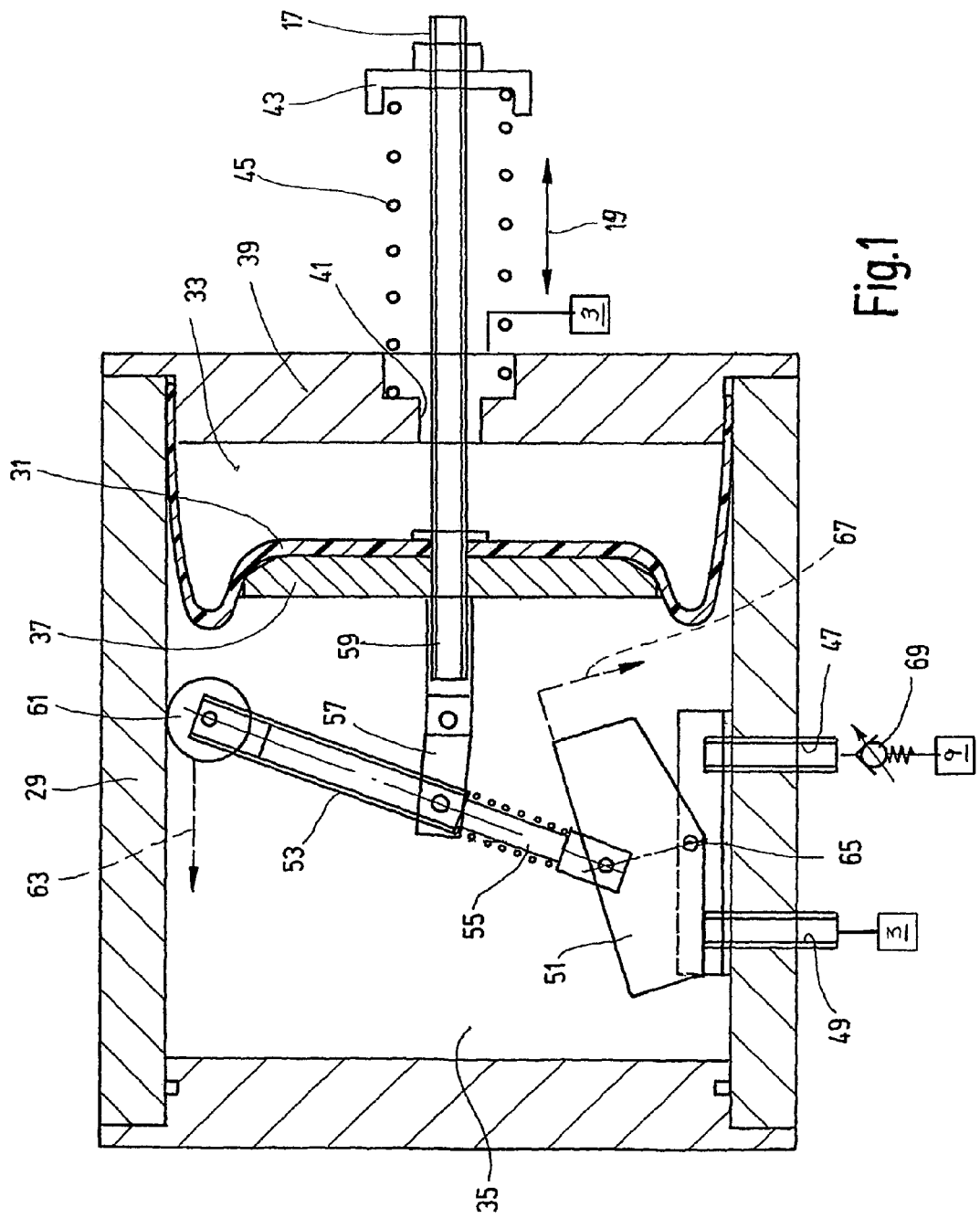
FIG. 1 shows a greatly simplified, diagrammatic side elevational view in section of the diaphragm accumulator according to an embodiment of the drive device of the present invention.

The mechanism for generating the reciprocating movement of the rod 17 is illustrated in detail in FIG. 1. This mechanism has a hydraulic accumulator in the form of a diaphragm accumulator 29. The diaphragm 31 of accumulator 29 forms a movable separating element between a first accumulator space 33 and a second accumulator space 35. A pressure plate 37 is applied to the diaphragm 31 on its side facing the second accumulator space 35, and is rigidly connected to the actuating rod 17. Actuating rod 17 is centrally positioned in and extends in the longitudinal direction of the housing of the diaphragm accumulator 29, and may be moved back and forth in this longitudinal direction (double arrow 19) as the diaphragm 31 is moved. The cover 39 on the end side and positioned on the accumulator space 33 not only forms a guide for the actuating rod 17, but also has ports 41 by which the accumulator space 33 is connected to the space 3 containing the fluid to be filtered (see FIG. 3) of the strip-filter mechanism. The pressure of the fluid to be filtered then prevails in the accumulator space 33 during operation. A pressure spring 45 is supported by the cover 39 and a stop plate 43 of the actuating rod 17 so that the diaphragm 31 and actuating rod 17 are pretensioned for movement to the right, as shown in the drawing, into an end position illustrated in FIG. 1.

The space 35 positioned on the left in FIG. 1 is closed up to a first fluid connection 47 and a second fluid connection 49. A control valve situated in the space 35 has a movable valve body 51. The valve body 51, which is indicated only in highly simplified diagrammatic form in FIG. 1, forms part of a seat valve by which one of the fluid connections 47, 49 may be opened while the other connection 47, 49 may be closed, depending on the position of the valve body 51. The valve body 51 may be controlled by the movement of the diaphragm 31. When the diaphragm 31 is situated in the end position, shown in FIG. 1 to be on the right side, the valve body 51 is in a position in which the first fluid connection 47 is open and the second fluid connection 49 is closed. The valve body 51 is actuated by an above-center or over-center tilting mechanism connecting this element 51 to the diaphragm 31. The valve body 51 is switched more or less instantly only in the two end positions of the diaphragm 31. This tilting mechanism has an actuating rod 55 which is hinge-connected or pivoted to the valve body 51 at one end, and is slidable in a sleeve 53 and guided in movement against the force of a spring. The sleeve is hinge-connected or pivotally by a forked connecting rod 57 to the facing end 59 of the actuating rod 17. A roll 61, which rolls on the inside of the diaphragm accumulator housing, is positioned at the free end of the sleeve 53.

When the diaphragm 31 moves to the left from the end position shown in FIG. 1, the sleeve 53 is moved. The roll 61 rolls on the inner wall of the accumulator in the direction of an arrow 63. The rod 55 enters the sleeve 53 a short distance against the force of the spring. When the above-center position of the sleeve 53 is reached, such being the case when the left-side end position of the diaphragm 31 is reached, the rod 55, under the force of the spring, reverses the valve body 51 about its fulcrum 65, in a tilting movement indicated by a broken-line arrow 67 into the other valve position. The fluid connection 49 is then instantly opened, and the fluid connection 47 is instantly closed.

The method of operation of the drive device is as follows. The pressure of the fluid to be filtered prevails in the accumulator space 33 in the position illustrated in FIG. 1. The pressure prevailing in the other accumulator space 35 is set at a correspondingly lower pressure by the pressure control valve 69 mounted on the fluid connection 47. If, during the operation of the strip-filter mechanism, the pressure of the fluid to be filtered and so the pressure in the accumulator space 33 increases as a result of increase in the extent of fouling of the filter material to a value at which the action of the reset spring 45 tends to retain the diaphragm 31 in the end position on the right shown in FIG. 1 is overcome, the diaphragm 31 and accordingly the actuating rod 17 are moved to the left as shown in FIG. 1. The winding shaft 13 (see FIG. 2) is rotated by the ratchet drive 15 so that used filter material is wound off the feed roll 5 and onto the take-up roll 11 by the winding shaft 13.

When the end position of the diaphragm 31 on the left-side end is reached (this position is not illustrated), the tilting mechanism instantly reverses the valve body, so that the fluid connection 49 is opened and the fluid connection 47 closed as a result of the pivoting indicated by the arrow 67 (FIG. 1). The fluid connection 49 is connected to the fluid to be filtered (space 3 in FIG. 3), so that the same pressure now prevails in the accumulator space 35 as in the accumulator space 33. As a result of the equal pressure, the diaphragm 31 is moved by the force of the reset of the spring 45 back to the right into the end position shown in FIG. 1. The tilting mechanism moves the valve body 51 in turn into the valve position illustrated in FIG. 1, so that the initial state is again reached, that is, the operating cycle is completed.

In place of the connection of an adjustable pressure control valve to the fluid connection 47, the fluid connection 47 could be connected directly to the space 9 (FIG. 3) containing the filtered fluid, in which the pressure level is lower than that in the space 3. When a pressure control valve 69 is used, the resulting controlled amount is discharged into the tank (not shown) upstream from the strip-filter mechanism.

FIGS. 2 and 3 show that the entire drive device is installed in the housing 1 of an appropriate strip-filter mechanism. As is to be seen in FIG. 3, as the operation progresses in which filter material is in succession wound off the feed roll 5 and onto the take-up roll 11, the take-up roll 11 becomes greater in diameter, while the diameter of the feed roll 5 becomes smaller. As FIGS. 2 and 3 show, in keeping with this circumstance, the winding shaft 13 and the take-up roll 11 are mounted on a pivoted rocker 71. As FIG. 2 shows, all components of the drive device are mounted on this rocker 71, that is, both the diaphragm accumulator 29 with the actuating rod 17 and the ratchet drive 15 for the winding shaft 13, which may be actuated by this rod. Consequently, as the diameter of the take-up roll 11 increases, the entire drive device may be moved by the rocker 71 to adjust to the diameter of the increased roll 11a, so that the axis of rotation of the winding shaft 13 may be displaced, as is illustrated by broken lines in FIG. 3.

The diaphragm accumulator 29 provided in the exemplary embodiment may be replaced by a hydraulic accumulator of another type with a movable separating element to actuate the actuating rod 17 of the drive device in reciprocating movement. The hydraulic accumulator is not to be understood in the classic sense as performing the function of storing hydraulic energy, but is rather to be viewed more as a medium separating element, one separating element 31 separating two media accumulator spaces 33, 35.

The differential pressure measured could also be represented by the dynamic pressure, which increases with increase in the extent of fouling. In this instance, the accumulator space 35 preferably is connected to the tank by the valve 69. The amount of the differential pressure or of the dynamic pressure may be adjusted by the force of the spring of the respective valve 69. In addition, the tilting mechanism 53, 55 performs a safety function in that it initiates a discharge process, for example, when the pressure peaks in the respective accumulator space are impermissibly high. Since the fluid connection 49 of the accumulator space 35 may be connected to the fouled side of the device, a suitable filter device (not shown) may be provided upstream from the connection 49.

While one embodiment has been chosen to illustrate the invention, it will be understood by those skilled in the art that various changes and modifications can be made therein without departing from the scope of the invention as defined in the appended claims.

What is claimed is:

1. A hydromechanical drive for generating feed movements of strip filter material as a function of prevailing pressure of fluid to be filtered, comprising:
   a hydraulic accumulator having a movable separating element separating a first accumulator space from a second accumulator space in said accumulator, said first accumulator space being supplied with pressure of fluid to be filtered;
   an actuating mechanism converting movement of said separating element to a feed movement of strip filter material; and
   a pressure control generating in said second accumulator space a pressure lower than a pressure affecting movement of said separating element as a function of pressure or extent of fouling of the fluid to be filtered, said pressure control having first and second fluid connections into said second accumulator space, said first fluid connection providing pressure to said second accumulator space less than pressure in said first accumulator space, said second fluid connection providing pressure to said second accumulator space of pressure in said first accumulator space, said pressure control also including a control valve actuated by movement of said separating element to open said first fluid connection and to close said second fluid connection when said separating element is in a first end position and to close said first fluid connection and to open said second fluid connection when said separating element is in an opposite, second end position.

2. A hydromechanical drive according to claim 1 wherein said second fluid connection and said first accumulator space are connected to the fluid to be filtered.

3. A hydromechanical drive according to claim 2 wherein said second fluid connection is connected to a pressure control valve adjustable to a pressure valve lower than pressure of fluid to be filtered at said second fluid connection.

4. A hydromechanical drive according to claim 1 wherein said first fluid connection is connected to filtered fluid passed and filtered through strip filter material, said filtered fluid having a pressure lower than pressure of the fluid to be filtered.

5. A hydromechanical drive according to claim 1 wherein said control valve is connected to said movable separating element by a kinetic mechanism for reversing said control valve only when said movable separating element is in one of said end positions.

6. A hydromechanical drive according to claim 5 wherein said kinetic mechanism comprises an over-center tilting mechanism that essentially instantaneously opens and closes said first and second fluid connections.

7. A hydromechanical drive according to claim 1 wherein a spring biases said movable separating element towards said first end position.

8. A hydromechanical drive according to claim 7 wherein
said actuating mechanism comprises an actuating rod that reciprocates along a longitudinal axis thereof and that is connected to said movable separating element.

9. A hydromechanical drive according to claim 8 wherein
said actuating mechanism comprises a ratchet drive including a ratchet wheel drivable in only one rotational direction by reciprocating movement of said actuating rod, said ratchet wheel being connected to a winding shaft for driving a strip filter material roll coupled thereto.

10. A hydromechanical drive according to claim 9 wherein
said ratchet drive is mounted on a pivotally mounted rocker for displacement of a winding shaft rotational axis to adapt to different roll diameters of strip filter material.

11. A hydromechanical drive according to claim 1 wherein
said hydraulic accumulator comprises a port in fluid communication with said first accumulator space and with a space containing fluid to be filtered by strip filter material.

12. A hydromechanical drive according to claim 11 wherein
said control valve is connected to said movable separating element by a kinetic mechanism for reversing said control valve only when said movable separating element is in one of said end positions;
said kinetic mechanism comprises an over-center tilting mechanism that essentially instantaneously opens and closes said first and second fluid connections; and
said separating element is coupled to a control component of said tilting mechanism.

13. A hydromechanical drive according to claim 1 wherein
said hydraulic accumulator is a diaphragm accumulator.

14. A hydromechanical drive according to claim 13 wherein
said control valve is connected to said movable separating element by a kinetic mechanism for reversing said control valve only when said movable separating element is in one of said end positions;
said kinetic mechanism comprises an over-center tilting mechanism that essentially instantaneously opens and closes said first and second fluid connections;
said separating element is coupled to a control component of said tilting mechanism; and
a pressure plate rests against a diaphragm of said diaphragm accumulator, and is coupled to said control component.

15. A hydromechanical drive according to claim 14 wherein
said tilting mechanism and said control valve are mounted in said second accumulator space.

* * * * *